(12) United States Patent
Kunc et al.

(10) Patent No.: US 10,128,913 B2
(45) Date of Patent: *Nov. 13, 2018

(54) METHOD AND CIRCUIT OF AN ACTIVELY TRANSMITTING TAG

(71) Applicant: STMicroelectronics International N.V., Schiphol (NL)

(72) Inventors: Vinko Kunc, Ljubljana (SI); Maksimiljan Stiglic, Maribor (SI); Kosta Kovacic, Orehova vas (SI); Albin Pevec, Ljubljana (SI); Anton Stern, Preddvor (SI)

(73) Assignee: STMicroelectronics International N.V., Schiphol (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,380

(22) Filed: Aug. 4, 2017

(65) Prior Publication Data
US 2017/0338862 A1 Nov. 23, 2017

Related U.S. Application Data

(63) Continuation of application No. 14/761,291, filed as application No. PCT/EP2014/050599 on Jan. 14, 2014, now Pat. No. 9,760,822.

(30) Foreign Application Priority Data

Jan. 15, 2013 (SI) .................................. 201300010

(51) Int. Cl.
*H04Q 5/22* (2006.01)
*H04B 5/00* (2006.01)
(Continued)

(52) U.S. Cl.
CPC ....... *H04B 5/0056* (2013.01); *G06K 7/10297* (2013.01); *G06K 19/0705* (2013.01);
(Continued)

(58) Field of Classification Search
CPC .. H04B 5/0056; H04B 5/0075; H04B 5/0081; G06K 7/10297; G06K 19/0705; G06K 19/0723; G06K 19/0726; G06K 19/0701
(Continued)

(56) References Cited

U.S. PATENT DOCUMENTS 4,471,340 A * 9/1984 Lewis ..................... H03M 1/60
   341/118
5,117,698 A * 6/1992 Baumoel ................. G01F 1/667
   73/861.28
(Continued)

FOREIGN PATENT DOCUMENTS

| EP | 1801741 A2 | 6/2007 |
| EP | 1801741 B1 | 7/2009 |
| EP | 2431925 A1 | 3/2012 |

OTHER PUBLICATIONS

FeliCa Card User's Manual, Version 2.0, No. M617-E02-00, Sony Corporation, Oct. 2012, pp. 1-93.
(Continued)

*Primary Examiner* — Kerri McNally
*Assistant Examiner* — Thang Tran
(74) *Attorney, Agent, or Firm* — Slater Matsil, LLP

(57) ABSTRACT

A circuit of an actively transmitting tag includes an antenna, a digitizer, a voltage-controlled oscillator (VCO), an output amplifier, a phase-displacement detector, and a regulator. The input of the digitizer connects to the antenna. The outputs of the digitizer and the output amplifier are connected to the input terminals of the phase-displacement detector. The output amplifier connects the output of the
(Continued)

VCO to the antenna and the regulator connects the output of the phase-displacement detector to the VCO.

20 Claims, 2 Drawing Sheets

(51) Int. Cl.
*G06K 19/07* (2006.01)
*G06K 7/10* (2006.01)

(52) U.S. Cl.
CPC ..... *G06K 19/0723* (2013.01); *G06K 19/0726* (2013.01); *H04B 5/0075* (2013.01); *G06K 19/0701* (2013.01); *H04B 5/0081* (2013.01)

(58) Field of Classification Search
USPC .......................... 340/572.1–572.9, 10.1–10.6
See application file for complete search history.

(56) References Cited

U.S. PATENT DOCUMENTS

| | | | | |
|---|---|---|---|---|
| 6,510,229 | B1* | 1/2003 | Geile | G06F 17/14 348/723 |
| 6,696,879 | B1* | 2/2004 | O'Toole | G06K 7/0008 327/356 |
| 7,239,858 | B2* | 7/2007 | Bellantoni | H04B 1/0458 455/277.1 |
| 7,405,662 | B2* | 7/2008 | Steinke | G06K 7/0008 340/572.1 |
| 7,604,178 | B2* | 10/2009 | Stewart | G06K 7/10039 235/492 |
| 2003/0185128 | A1* | 10/2003 | Shoji | G11B 7/0053 369/59.25 |
| 2005/0140457 | A1* | 6/2005 | Bellantoni | G06K 7/0008 332/106 |
| 2009/0174592 | A1* | 7/2009 | Muellner | G06K 19/0723 342/51 |
| 2011/0304459 | A1* | 12/2011 | Kwon | G06K 7/10297 340/568.8 |
| 2012/0071089 | A1* | 3/2012 | Charrat | G06K 19/0723 455/41.1 |
| 2013/0003712 | A1* | 1/2013 | Kunc | H04B 5/0068 370/345 |

OTHER PUBLICATIONS

FeliCa Lite-S User's Manual, Version 1.2, No. M741-E01-00, Sony Corporation, Oct. 2012, pp. 1-103.
ISO/IEC 14443-1 Part 1: Physical characteristics, Second Edition, Jun. 15, 2008, 12 pages, Reference No. ISO|IEC 14443-1:2008(E), Geneva, Switzerland.
ISO/IEC FDIS 14443-2 Part 2: Radio frequencey power and signal interface, Second Edition, 2010, 32 pages, Reference No. ISO/IEC FDIS 14443-2:2010(E), Geneva, Switzerland.
ISO/IEC FDIS 14443-3 Part 3: Initialization and anticollision, Second Edition, 2009, 70 pages, Reference No. ISO-IEC FDIS 14443-3:2009(E), Geneva, Switzerland.
ISO/IEC FDIS 14443-4 Part 4: Transmission protocol, Second Edition, 2008, 46 pages, Reference No. ISOIIEC FDIS 14443-4:2008(E), Geneva, Switzerland.

* cited by examiner

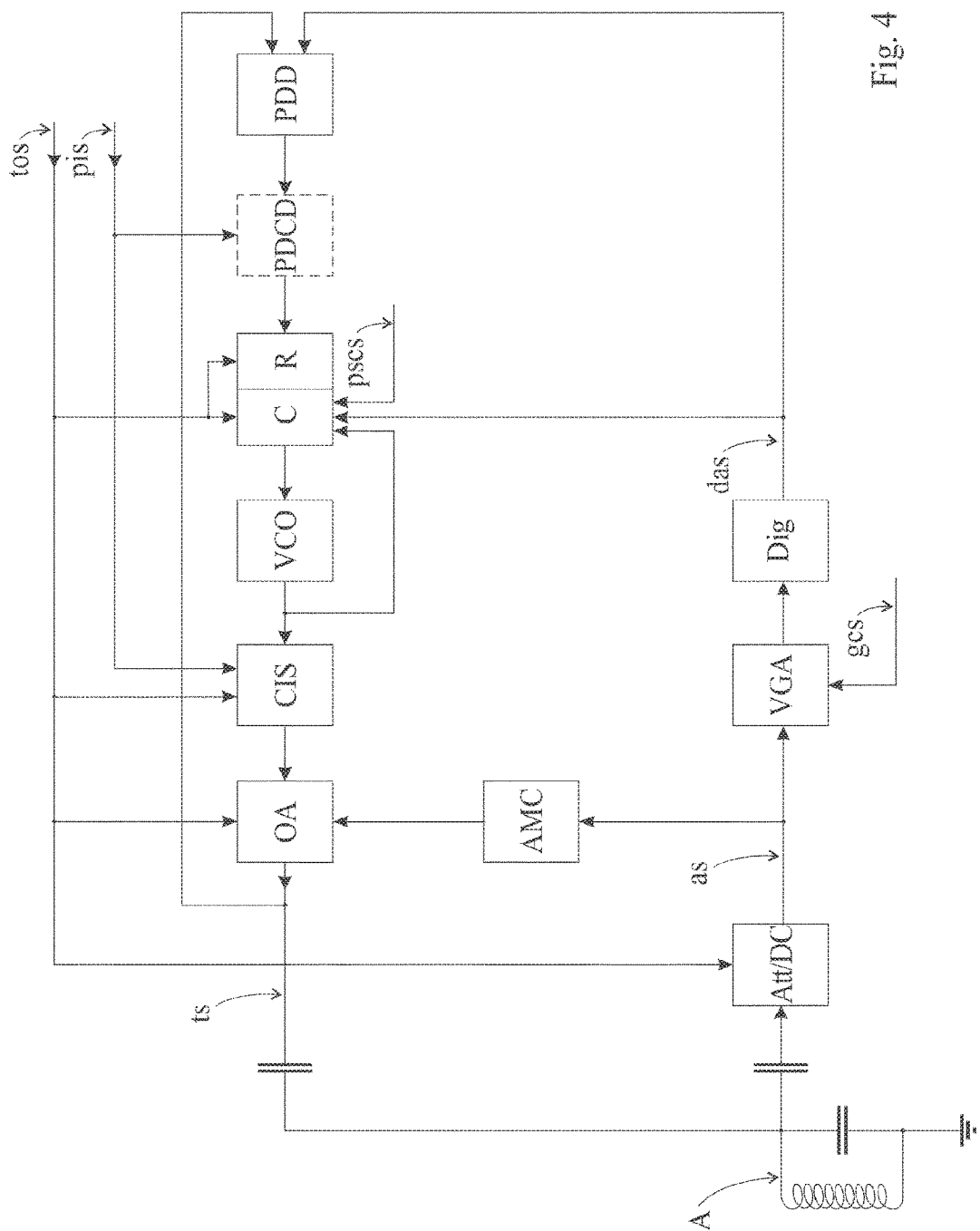

METHOD AND CIRCUIT OF AN ACTIVELY TRANSMITTING TAG

CROSS-REFERENCE TO RELATED APPLICATIONS

This application is a continuation of U.S. patent application Ser. No. 14/761,291, filed on Jul. 15, 2015, which is a national stage filing of International Application No. PCT/EP2014/050599, filed on Jan. 14, 2014, which claims priority to Slovenian Application No. 201300010, filed on Jan. 15, 2013, which applications are hereby incorporated herein by reference.

TECHNICAL FIELD

The invention is related to a method and a circuit of an actively transmitting tag intended for a communication with an interrogator.

BACKGROUND OF THE INVENTION

The method and the circuit of the actively transmitting tag is designed for high-frequency communication with an interrogator, whereat the tag's circuit observes a phase of a tag's antenna signal before the tag starts transmitting a data frame. The method and the circuit of the invention are intended for communication according to communication protocol ISO 14443 B with phase inversions at transitions between half-periods of a subcarrier in a transmitted signal as well as according to communication protocol ISO 14443 A with phase inversions at transitions between half-periods of a subcarrier in a transmitted signal in transmissions with bit rates of 212 kb/s, 424 kb/s or 848 kb/s, or according to other communication protocols (e.g., FELICA), in which the actively transmitting tag transmits long data frames, whereat the actively transmitting tag controls a phase of the transmitted signal by detecting a phase of the transmitted signal with regard to a phase of the current antenna signal.

A signal of an actively transmitting tag constructively interferes with an interrogator's transmitted signal at an interrogator antenna. Therefore the tag's signal is detected in a considerably stronger way than a signal transmitted by a passive tag of equal dimensions, which passive tag load-modulates the interrogator signal.

A tiny antenna of the actively transmitting tag manages to build-up a sufficiently strong signal at the interrogator antenna, which accelerates development of actively transmitting tags.

The constructive interference at the interrogator antenna is accomplished by the actively transmitting tag, which matches a phase and a frequency of the transmitted signal with a received interrogator signal to the best possible extent.

Known technical solutions (Giesecke & Devrient GmbH, Inside Contactless S.A. and IDS d.o.o. together with Austriamicrosystems AG) attain the matching in various ways and have diverse levels of success in practical applications.

Patent EP 1801741 B1 (Giesecke & Devrient) discloses the technical solution, in which the actively transmitting tag matches its transmitted signal to a received interrogator signal in phase and frequency before it starts transmitting a data frame. The phase and the frequency are not corrected during transmitting the data frame, and as a result no reliable communication can be guaranteed.

According to the known technical solution as disclosed in patent EP 2431925 B1 (Inside Contactless S.A.), the phase and the frequency of the tag's transmitted signal are matched to the received interrogator signal before the tag starts transmitting, in fact before each transmitted burst. A packet of eight waves with a carrier frequency of 13.56 MHz represents the burst. In communication according to protocol ISO 14443 A or ISO 14443 B, the burst extends over one half-period of a subcarrier of the transmitted signal.

An actively transmitting tag as disclosed in patent application PCT/SI2012/000024 (IDS d.o.o. together with Austriamicrosystems AG) observes a phase of an interrogator's signal induced in a tag's antenna in such adequately selected time intervals and located even within a data frame being transmitted, in which time intervals, according to a communication protocol, the smart tag does not transmit packets of high-frequency radio waves, and after each such time interval has passed the actively transmitting tag starts transmitting a high-frequency wave packet by exciting its own antenna with the transmitted signal, a phase of which transmitted signal is always set, at the beginning of transmitting each the high-frequency wave packet, shifted with respect to the phase of the antenna signal by the same phase angle.

The patent EP 1801741 B1 also suggests a way of communicating that the high-frequency wave packet is transmitted with a certain phase during the half-period of a subcarrier of the transmitted signal and in a next half-period with the inverted phase. An amplitude of the tag's signal at the interrogator antenna thus gets doubled and communication range is increased.

Voltage of a transmitted signal at an antenna of an actively transmitting tag is represented in FIG. 1 by a first and second windows for communication according to protocol ISO 14443 A and ISO 14443 B, and by a third and fourth windows for communication according to protocol ISO 14443 A and ISO 14443 B, in both cases by inverting a phase at transitions between half-periods of a subcarrier of the transmitted signal.

The method as disclosed in patent EP 2431925 B1 is not feasible when communicating by inverting a phase at transitions between half-periods of a subcarrier of the transmitted signal either according to protocol ISO 14443 A or according to protocol ISO 14443 B since the first burst is immediately and without a pause followed by a second burst and so on; a half-period of the subcarrier, in which a phase of the interrogator signal would be observed in order to phase-rematch a tag's generator of the transmitted signal, is here no longer available.

The method as disclosed by patent application PCT/SI2012/000024 can be applied in communicating by inverting a phase at transitions between half-periods of the transmitted signal subcarrier according to protocol ISO 14443 A because the actively transmitting tag does not transmit during a time interval with a length of one half of bit or of four periods of the subcarrier. The method, in turn, cannot be applied when communicating by the inverting the phase according to protocol ISO 14443 B. In this communication protocol the actively transmitting tag uninterruptedly transmits and there is no time window available to match the phase and the frequency throughout the transmission of the complete data frame.

SUMMARY OF THE INVENTION

In an embodiment, matching of a phase and a frequency of a transmitted signal of an actively transmitting tag within each half-period of a subcarrier of the transmitted signal to a phase and a frequency of a received interrogator signal is carried out when communicating according to protocol ISO 14443 B by inverting a phase at transitions between the half-periods of the transmitted signal subcarrier as well as according to protocol ISO 14443 A with the phase inverting at higher transmission bit rates such as 212 kb/s, 424 kb/s or 848 kb/s or according to other protocols by the phase inverting (e.g., FELICA) whereat the actively transmitting tag transmits a long data frame.

In an embodiment, the matching is performed by a method intended for high-frequency communication between an interrogator and an actively transmitting tag and by a circuit for carrying out the method.

An embodiment proposes synchronizing a signal transmitted by the actively transmitting tag to a received interrogator signal during tag's transmission, which enables the actively transmitting tag to transmit a long data frame even according to protocol ISO 14443 B with phase inversions at transitions between half-periods of a transmitted signal subcarrier. The embodiment makes the synchronizing possible although the transmitted data frame is devoid of a time window without transmitting.

BRIEF DESCRIPTION OF THE DRAWINGS

The invention will now be explained in more detail by way of a description of embodiments of the method as well as the circuit intended for high-frequency communication of an actively transmitting tag with an interrogator as well as by way of drawings representing in FIG. 1 in a first to a fourth window, a voltage of a transmitted signal at an antenna of an actively transmitting tag;

FIG. 4 a block diagram of a tag's circuit for high-frequency communication between the interrogator and the actively transmitting tag according to a protocol by phase inverting at transitions between half-periods of the transmitted signal subcarrier.

DETAILED DESCRIPTION

Figure 2:
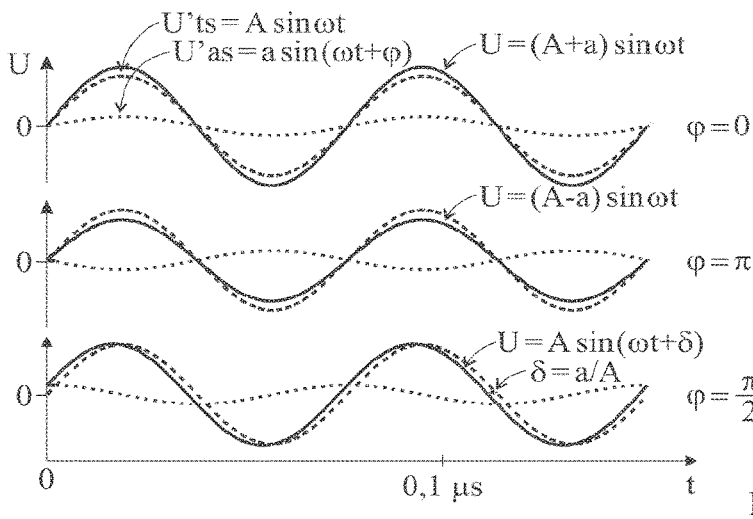
FIG. 2 in a first, second and third window, time development of a signal U'as on a tag's antenna the signal being induced by an interrogator's electromagnetic field in absence of a tag's transmitted signal U'ts, time development of the tag's transmitted signal U'ts on the tag's antenna in absence of the interrogator's induced signal and time development of a resulting signal U on the antenna of the actively transmitting tag located in the interrogator's electromagnetic field, specifically when a phase shift φ of the interrogator's induced signal with regard to a phase of the tag's transmitted signal equals 0, π and π/2, respectively.

A ratio between an amplitude of a signal U'as on a tag's antenna A, the signal being induced by an interrogator's electromagnetic field in absence of a tag's transmitted signal U'ts, and an amplitude of the tag's transmitted signal U'ts on the tag's antenna A ranges from a value of several hundredths of a millivolt to several tenths of a millivolt to a value of several volts to several tens of volts (FIGS. 2 and 4).

Hence, the tag's transmitted signal ts overlaps the signal U'as as induced by the interrogator. They are exactly a phase and a frequency of the signal U'as as induced by the interrogator whereon a phase and a frequency of the tag's transmitted signal ts should be based in order for constructive interference to be achieved at an interrogator antenna between the signal as transmitted by the actively transmitting tag and the interrogator's own transmitted signal. It is the constructive interference, on which the efficiency of the actively transmitting tag is based.

Consideration of three cases of superposing two sine-wave signals as represented in FIG. 2 contributes to a solution of the technical problem, which is: how to carry out matching of a phase and a frequency of a transmitted signal of the actively transmitting tag within each half-period of a subcarrier of the transmitted signal with a phase and a frequency of a weak received interrogator signal—they are exactly the phase and the frequency of the weak interrogator signal whereon the phase and frequency of the tag's transmitted signal ts should be based—when communicating according to protocol ISO 14443 B with inverting a phase at transitions between half-periods of a subcarrier of the transmitted signal as well as according to protocol ISO 14443 A with the phase inverting in higher transmission bit rates such as 212 kb/s, 424 kb/s or 848 kb/s or according to other protocols with the phase inverting (e.g. FELICA), in which the actively transmitting tag transmits a long data frame.

It should be taken into consideration that the actively transmitting tag either transmits during all half-periods of a subcarrier or at least during a half of them, therefore the weak interrogator signal is overlapped by the tag's transmitted signal all the time or at least a considerable part of time.

The signal U'as (dash-dotted) as induced in the tag's antenna by the interrogator's electromagnetic field when the tag's transmitted signal U'ts (dashed) is absent (prime) is superposed in the tag's antenna on the tag's transmitted signal U'ts during tag's transmission. The tag's transmitted signal U'ts has a time development U'ts=A sin(ωt), when the induced interrogator signal is absent (prime). The signal U'as has a time development U'as=a sin(ωt+φ), wherein a<<A and φ is a phase shift of the induced signal with regard to the tag's transmitted signal U'ts.

When the tag receives the interrogator signal and transmits at the same time, a resulting signal U (uninterrupted line) at the tag's antenna is not phase shifted (δ=0) with regard to the tag's transmitted signal U'ts and the amplitude A is only changed at the phase shifts φ=0 and φ=π (first and second window, respectively): U=(A±a) sin(ωt), whereas the resulting signal U is phase shifted by δ=±a/A with regard to the tag's transmitted signal U'ts and the amplitude does not change at the phase shift φ=±π/2 (third window): U=A sin(ωt+δ).

Accordingly, the phase shift δ is a measure of the phase shift φ.

Figure 3:
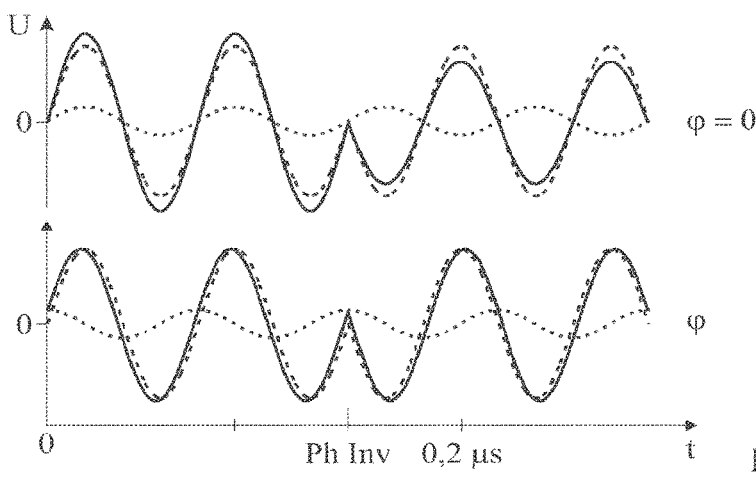
FIG. 3 in a first and second window, time development of the same three signals close to a time moment PhInv of phase inverting when the phase shift φ equals 0 and when phase shift φ is not close to 0 or π, respectively.

A time development of the three signals in the proximity of a point PhInv denoting the phase inversion is represented in FIG. 3 for the phase shift φ equaling 0 and the phase shift φ differing from 0. The phase shift δ of the resulting signal U with regard to the tag's transmitted signal U'ts and even more its doubled value as obtained by building a difference of the phase shifts φ before and after the inverting point PhInv can be chosen as a quantity, whereon a regulating can be based when generating the transmitted signal is for communicating according to communication protocol ISO 14443 B with phase inversions at transitions between half-periods of the subcarrier in the transmitted signal as well as according to communication protocol ISO 14443 A with the phase inversions at transitions between half-periods of the subcarrier in the transmitted signal for the transmission with higher bit rates of 212 kb/s, 424 kb/s or 848 kb/s, or according to other communication protocols (e.g. FELICA), at which the actively transmitting tag transmits with the phase inversions.

A method for high-frequency communication between an interrogator and an actively transmitting tag starts to be carried out by any known method, e.g. a method as disclosed in patent application PCT/SI2012/000024 for matching the phase of the tag's transmitted signal ts to the interrogator signal at the beginning of the transmission when the actively transmitting tag starts transmitting.

Before the actively transmitting tag situated in an interrogator's radiation field starts transmitting a data frame, it first observes a phase of an antenna signal as being a signal as induced by the interrogator at that time (FIG. 4). At this time, the actively transmitting tag does not yet generate a sequence of high-frequency wave packets for the transmitted signal ts.

The actively transmitting tag then starts generating and transmitting the data frame in the form of a sequence of high-frequency wave packets by exciting its own antenna A with the transmitted signal ts, which is synchronous with the antenna signal as as present up to that time, namely the transmitted signal ts has the same frequency and a constant desired phase shift with regard to the antenna signal as.

At the beginning of the transmission, the phase of the transmitted signal ts is set shifted by a chosen first phase shift with regard to the phase of the antenna signal as present up to that time. A value of the first shift is optionally set to zero. The transmitted signal ts is conducted to the tag antenna A through a matching circuit.

According to an embodiment, the actively transmitting tag transmits the data frame in a way that it transmits high-frequency wave packets with a length of one half-period of a subcarrier of the transmitted signal ts and a phase being inverted according to communication protocol each time at the end of the subcarrier half-period.

In time intervals with the length of one subcarrier half-period during the data frame transmission, the actively transmitting tag detects a shift of the phase of the antenna signal as with regard to the phase of the transmitted signal ts as a second phase shift.

According to an embodiment, the actively transmitting tag controls generating the high-frequency wave packet each time after transition into a subsequent half-period of the subcarrier according to the second shift in phase as detected in a previous subcarrier half-period.

On the one hand, the actively transmitting tag controls generating the high-frequency wave packets in a way that the second shift in phase retains a constant absolute value at the transitions into the subsequent subcarrier half-period. Optionally, the second shift in phase remains zero at the transitions.

On the other hand, the actively transmitting tag may calculate a difference between the second shift in phase for the current half-period of the subcarrier and the second shift in phase for the previous subcarrier half-period. The generation of the high-frequency wave packets is now controlled in a way that the difference between the second shifts in phase retains a constant absolute value at the transitions into the subsequent subcarrier half-period. Optionally, the difference between the second shifts in phase should remain zero.

Any communication protocol, according to which the phase is inverted at the transitions between the subcarrier half-periods, can be used for carrying out the method of an aspect of the invention.

Figure 1:
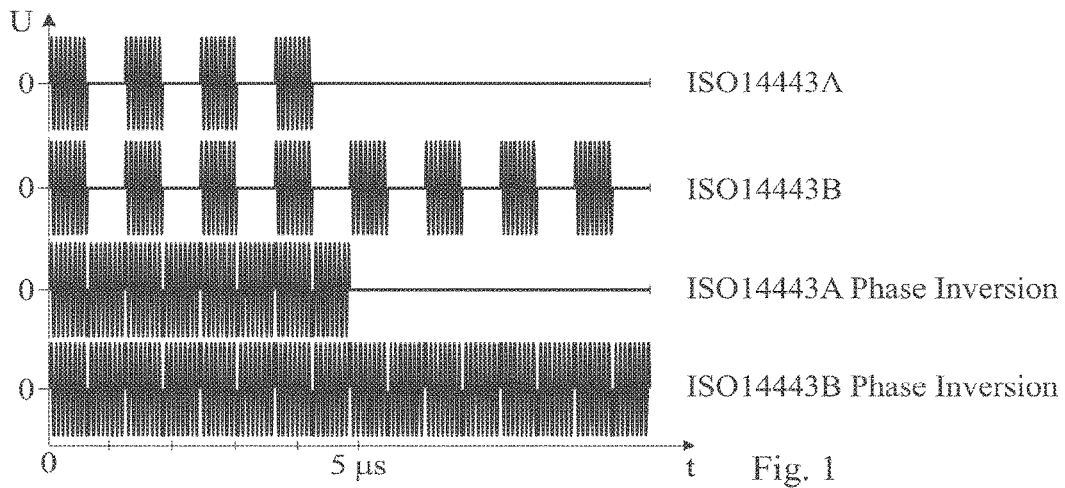

Communication protocol ISO 14443 B, according to which the phase is inverted at the transitions between the subcarrier half-periods, is such protocol (FIG. 1 window 4). During data frame transmission according to this communication protocol, the actively transmitting tag has no time window without transmitting at its disposal and, during which time window it would be able to detect the first phase shift as according to the state of the art.

Communication protocol ISO 14443 A with phase inversions at the transitions between the subcarrier half-periods and for the transmission with bit rates of 212 kb/s, 424 kb/s or 848 kb/s or protocol FELICA are also suited as protocols for carrying out the method of an aspect of the invention.

A circuit for high-frequency communication of an actively transmitting tag with an interrogator may also be based on a known circuit as disclosed in patent application PCT/SI2012/000024.

In this known circuit, an antenna signal as from a tag antenna A is conducted into a digitizer Dig through an attenuating and DC voltage defining circuit Att/DC as well as a variable gain amplifier VGA. The gain is adjusted by a control signal gcs.

A digitized antenna signal das from an output of the digitizer Dig is conducted to an input of a phase-frequency comparator C, which observes a phase of the antenna signal as due to an interrogator's radiation field, already before the actively transmitting tag starts transmitting a data frame. The phase-frequency comparator C is controlled by a phase-shift control signal pscs setting a first phase shift.

The phase-frequency comparator C controls a voltage-controlled oscillator VCO in a way to start generating a transmitted signal ts. At the beginning of a data frame transmission it is shifted with regard to the antenna signal as by the observed first phase shift.

The transmitted signal ts is conducted through an output amplifier OA and a matching circuit to the antenna A in the form of a sequence of high-frequency wave packets.

Both, the output amplifier OA and the attenuating and DC voltage defining circuit Att/DC are controlled by means of a transmit-on signal tos defining a start and an end of the tag's transmitting. Before starting the transmission of the data frame a gain of the output amplifier OA is set with regard to intensity of the antenna signal as as measured by an amplitude measuring circuit AMC.

The actively transmitting tag transmits the data frame in a way that it generates and transmits the high-frequency wave packets each with a length of one subcarrier half-period of the transmitted signal ts, a phase of the wave packets being inverted according to a communication protocol each time at the end of the subcarrier half-period.

The communication protocol can be any communication protocol, according to which the phase is inverted at the transitions between the subcarrier half-periods.

According an embodiment, the output of the digitizer Dig and an output of the output amplifier OA are connected to input terminals of a phase-displacement detector PDD, which may be a mixing circuit. During the transmission of the actively transmitting tag in time intervals with the length of one subcarrier half-period, the phase-displacement detector PDD detects a shift of the phase of the antenna signal as with regard to a phase of the transmitted signal ts and generates a signal of a second phase shift.

The signal of the second phase shift from an output of the phase-displacement detector PDD is conducted to a regulator circuit R that controls the voltage-controlled oscillator VCO during transmission of the data frame in a way to generate the high-frequency wave packets according to the detected second phase shift.

The high-frequency wave packets from an output of the voltage-controlled oscillator VCO are conducted through an inverter stage CIS controlled by a phase-inverting signal pis. The phase of the transmitted signal ts is inverted according to a communication protocol.

On the one hand, the controlling the voltage-controlled oscillator VCO may be carried out in a way that the second phase shift retains a constant absolute value each time at the transitions into the subsequent subcarrier half-period. Optionally, the second phase shift remains zero.

On the other hand, the control may be carried out in the following way:

The second-phase-shift signal from the output of the phase-displacement detector PDD is conducted to an input of a controlled circuit PDCD for determining a change in the second phase shift. The circuit is controlled by the phase-inverting signal pis and calculates a difference between the second phase shift for the current subcarrier half-period and the second phase shift for the previous half-period of the subcarrier.

An output of the controlled circuit PDCD for the determination of the change in the second phase shift is connected to the regulator circuit R. The regulator circuit R controls the voltage-controlled oscillator VCO in a way that the change in the second phase shift retains a constant absolute value at the transitions into the subsequent subcarrier half-period and optionally remains zero.

What is claimed is:

1. A circuit of an actively transmitting tag, comprising
   an antenna configured to receive a receive signal and transmit a first transmit signal;
   a phase-displacement detector configured to:
      detect a phase shift value of the receive signal with respect to the first transmit signal at a set time interval, wherein the set time interval comprises a time period having a length of one subcarrier half-period corresponding to the first transmit signal; and
      generate a second transmit signal equal to the first transmit signal and shifted in phase by the phase shift value;
   a voltage-controlled oscillator (VCO) configured to generate a sequence of high-frequency wave packets, wherein the sequence of high-frequency wave packets comprises the first transmit signal and the second transmit signal; and
   a regulator, wherein an output of the phase-displacement detector is coupled via the regulator to the VCO.

2. The circuit according to claim 1, further comprising an output amplifier configured to transmit the sequence of high-frequency wave packets.

3. A method for high-frequency communication between an interrogator and an actively transmitting tag, the method comprising:
   determining, by the actively transmitting tag and prior to transmitting a data frame, a phase of an antenna signal due to a radiation field of the interrogator;
   exciting, through a matching circuit, an antenna of the actively transmitting tag with a transmitted signal, wherein the transmitted signal initially has a phase equal to the phase of the antenna signal;
   generating, by the actively transmitting tag, a sequence of high-frequency bursts corresponding with the data frame;
   transmitting, by the actively transmitting tag, the sequence of high-frequency bursts, wherein each high-frequency burst has a length of one subcarrier half-period of the transmitted signal and a phase inverted according to a communication protocol at an end of each subcarrier half-period;
   detecting, by the actively transmitting tag and during the transmitting of the data frame, a shift of the phase of the antenna signal relative to a phase of the transmitted signal in time intervals with a length of one subcarrier half-period; and
   controlling, by the actively transmitting tag, the generating of the sequence of high-frequency bursts according to the shift of the phase of the antenna signal after each transition into a subsequent subcarrier half-period.

4. The method according to claim 3, wherein controlling the generation of the sequence of high-frequency bursts comprises retaining a constant absolute value with respect to the shift of the phase of the antenna signal at the transitions into the subsequent subcarrier half-periods.

5. The method according to claim 4, wherein the shift of the phase of the antenna signal remains zero at the transitions into the subsequent subcarrier half-periods.

6. The method according to claim 3, further comprising:
   calculating, by the actively transmitting tag, a difference between a shift of the phase of the antenna signal for a current subcarrier half-period and a shift of the phase of the antenna signal for a previous subcarrier half-period; and
   controlling, by the actively transmitting tag, the generation of the sequence of high-frequency bursts to retain a constant absolute value with respect to the difference between the shifts of the phase of the antenna signal at the transitions into the subsequent subcarrier half-periods.

7. The method according to claim 6, wherein the difference between the shifts of the phase of the antenna signal remains zero at transitions into subsequent subcarrier half-periods.

8. The method according to claim 3, wherein the communication protocol is any communication protocol, according to which the phase is inverted at the transitions between the subcarrier half-periods.

9. The method according to claim 8, wherein the communication protocol is a communication protocol ISO 14443 B, according to which the phase is inverted at the transitions between the subcarrier half-periods.

10. The method according to claim 8, wherein the communication protocol is a communication protocol ISO 14443 A, according to which the phase is inverted at the transitions between the subcarrier half-periods and bit rates for the transmission are 212 kb/s, 424 kb/s or 848 kb/s.

11. A circuit for high-frequency communication between an interrogator and an actively transmitting tag, the circuit comprising:
    an antenna configured to receive an antenna signal;
    a phase-frequency comparator configured to determine a phase of the antenna signal due to a radiation field of the interrogator prior to transmitting a data frame;
    a voltage-controlled oscillator (VCO) configured to generate a transmitted signal that initially has a phase equal to the phase of the antenna signal, wherein the transmitted signal is a sequence of high-frequency bursts corresponding with the data frame, and wherein each high-frequency burst has a length of one subcarrier half-period of the transmitted signal and a phase that is inverted according to a communication protocol at an end of each subcarrier half-period;

an output amplifier and a matching circuit configured to conduct the transmitted signal to the antenna;

a phase-displacement detector configured to, in time intervals with the length of one subcarrier half-period, detect a shift of the phase of the antenna signal relative to a phase of the transmitted signal; and a regulator configured to, during the transmission of the sequence of high-frequency bursts, control the VCO to generate the sequence of high-frequency bursts according to the shift of the phase of the antenna signal.

12. The circuit according to claim 11, further comprising a controlled inverter stage configured to invert the phase of the transmitted signal according to the communication protocol, wherein the controller inverter stage is controlled by a phase-inverting signal.

13. The circuit according to claim 11, wherein the phase-displacement detector is a mixing circuit.

14. The circuit according to claim 11, wherein the regulator is configured to control the VCO, at transitions into subsequent subcarrier half-periods, to retain a constant absolute value with respect to the shift of the phase of the antenna signal.

15. The circuit according to claim 11, wherein the regulator is configured to control the VCO, at transitions into subsequent subcarrier half-periods, to attain a zero phase shift with respect to the shift of the phase of the antenna signal.

16. The circuit according to claim 11, further comprising a control circuit, wherein an input of the control circuit is connected to an output of the phase-displacement detector, and wherein the control circuit is configured to calculate a difference between a shift of the phase of the antenna signal for a current subcarrier half-period and a shift of the phase of the antenna signal for a previous sub-carrier.

17. The circuit according to claim 16, wherein the control circuit is controlled by a phase-displacement signal from the output of the phase-displacement detector.

18. The circuit according to claim 16, wherein the regulator further comprises an input connected to an output of the control circuit, and wherein the regulator is configured to control the VCO, at each transition into subsequent subcarrier half-periods, to retain a constant absolute value with respect to the difference between the shift of the phase of the antenna signal for the current subcarrier half-period and the shift of the phase of the antenna signal for the previous sub-carrier.

19. The circuit according to claim 16, wherein the difference between the shift of the phase of the antenna signal for the current subcarrier half-period and the shift of the phase of the antenna signal for the previous sub-carrier remains zero at the transitions into subsequent subcarrier half-periods.

20. The circuit according to claim 11, wherein the regulator is configured to control the VCO to have any communication protocol, according to which the phase is inverted at transitions between the subcarrier half-periods.

* * * * *